(12) United States Patent
Potter et al.

(10) Patent No.: US 7,185,857 B2
(45) Date of Patent: Mar. 6, 2007

(54) THRUST VECTOR ACTUATION CONTROL SYSTEM AND METHOD

(75) Inventors: Calvin C. Potter, Mesa, AZ (US); Paul S. Evans, Mesa, AZ (US); Terry L. Keller, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 277 days.

(21) Appl. No.: 10/766,994

(22) Filed: Jan. 28, 2004

(65) Prior Publication Data

US 2005/0178886 A1    Aug. 18, 2005

(51) Int. Cl.
B64G 1/26    (2006.01)
(52) U.S. Cl. .................. 244/169; 244/52; 244/195
(58) Field of Classification Search ............. 244/52, 244/169, 78.1, 164, 194, 195
See application file for complete search history.

(56) References Cited

U.S. PATENT DOCUMENTS

| | | | |
|---|---|---|---|
| 2,396,568 A * | 3/1946 | Goddard ................ 244/78.1 |
| 3,737,103 A | 6/1973 | Howell et al. |
| 3,984,072 A * | 10/1976 | von Pragenau et al. ..... 244/169 |
| 5,042,752 A * | 8/1991 | Surauer et al. ............ 244/164 |
| 5,100,082 A * | 3/1992 | Archung .................... 244/78.1 |
| 5,442,909 A | 8/1995 | Snow et al. |
| 6,003,811 A * | 12/1999 | Trikha ....................... 244/78.1 |
| 6,102,337 A * | 8/2000 | Quartararo ................. 244/169 |
| 6,109,021 A | 8/2000 | Hanley et al. |
| 6,195,981 B1 | 3/2001 | Hanley et al. |
| 6,260,805 B1 * | 7/2001 | Yocum et al. .............. 244/164 |
| 6,318,668 B1 | 11/2001 | Ulanoski et al. |
| 6,948,367 B2 * | 9/2005 | Campbell et al. ............. 73/510 |

* cited by examiner

*Primary Examiner*—Galen Barefoot
(74) *Attorney, Agent, or Firm*—Ingrassia Fisher & Lorenz

(57) ABSTRACT

A thrust vector actuation control system and method is configured to allow self-testing of the entire actuation system and/or its individual system components. The control system also provides real-time, continuous monitoring of actuation system status, and allows system gain and compensation parameters to be changed during vehicle operation remote from its launch site.

22 Claims, 3 Drawing Sheets

THRUST VECTOR ACTUATION CONTROL SYSTEM AND METHOD

TECHNICAL FIELD

The present invention relates to an actuation control system and method and, more particularly, to a thrust vector actuation control system and method for waterborne and airborne vehicles.

BACKGROUND

The attitude of various types of vehicles, including both waterborne and airborne vehicles, can be controlled using various control surfaces and/or exhaust nozzles or jet vanes. For example, in many vehicles control along the roll axis may be implemented using one or more control surfaces, and control along the pitch and yaw axes of the vehicle may be implemented using the exhaust nozzles. In other vehicles, control along the roll, pitch, and yaw axes may be implemented using exhaust nozzles. In either case, a thrust vector control system may be included to implement control of the exhaust nozzles.

In general, when thrust vector control is implemented in a vehicle, the direction of thrust of one or more vehicle engines is controlled to effect an attitude change. More specifically, the orientation of one or more engine exhaust nozzles is preferably controlled to control the direction of thrust from each engine. To implement this control, the engine exhaust nozzles may be configured to be moveable in at least two degrees of freedom, one associated with the vehicle pitch axis and the other associated with the vehicle yaw axis. One or more actuators may be provided to move each nozzle to a commanded position, to thereby supply appropriate pitch, yaw, and/or roll attitude control.

The vehicle may additionally include a thrust vector actuator control circuit to control movement of the nozzle actuators, and thus the engine nozzles. The control circuit may receive vehicle attitude commands from an onboard flight computer or a remote station, and in turn supplies appropriate nozzle actuation control signals to the nozzle actuators, to thereby effectuate the commanded vehicle attitude. Presently, most of the thrust vector actuator control circuits installed in vehicles are implemented as an analog circuit.

Although the thrust vector actuation control circuits presently used are generally safe, reliable, and robustly designed, the circuits do suffer certain drawbacks. For example, the control circuits may not be configured to allow self-testing of the actuation system and/or individual system components, the control circuits may not allow real-time, continuous communication of actuation system status, and the control circuits may not allow system gains and compensation parameters to be changed during vehicle operation remote from the launch site. Moreover, because the control circuits may be implemented using analog technology, numerous components may be used, which can impact system reliability, weight, and overall cost.

Hence, there is a need for a thrust vector actuation system control circuit that addresses one or more of the above-noted drawbacks. Namely, a control circuit that allows self-testing of the thrust vector actuation system and/or its individual system components, and/or a control circuit that provides real-time, continuous monitoring of at least actuation system status, and/or a control circuit that allows system gain and compensation parameters to be changed during vehicle operation remote from its launch site, and/or a control circuit with increased reliability, reduced weight, and/or reduced cost, relative to present control circuits. The present invention addresses one or more of these drawbacks.

SUMMARY

The present invention provides a thrust reverser actuation control system and method that allows self-testing of the thrust vector actuation system and/or its individual system components, provides real-time, continuous monitoring of actuation system status, and allows system gain and compensation parameters to be changed during vehicle operation remote from its launch site.

In one embodiment, and by way of example only, a thrust vector actuation control system for controlling one or more engine exhaust nozzles includes a controller and one or more actuators. The controller is adapted to receive data representative of actuation control system status, and one or more nozzle position commands from a flight computer. The controller is configured to transmit at least some of the actuation system status data to the flight computer and, in response to the nozzle position command, to supply one or more nozzle actuator control signals. The actuators are adapted to receive the nozzle actuator control signals and are configured, in response thereto, to move one or more engine exhaust nozzles to the commanded position.

In another exemplary embodiment, a thrust vector actuation control system for controlling one or more engine exhaust nozzles includes a controller and one or more actuators. The controller is configured to implement a control law, and is adapted to receive data representative of updated control law variables and one or more nozzle position commands from a flight computer. The controller is further configured to modify the implemented control law to include the updated control law variables and, in response to the nozzle position commands, to supply one or more nozzle actuator control signals. The actuators are adapted to receive the nozzle actuator control signals and are configured, in response thereto, to move one or more engine exhaust nozzles to the commanded position.

In yet another exemplary embodiment, a propulsion vehicle includes an engine, a flight computer, a controller, and an actuator. The engine includes a movable exhaust nozzle. The flight computer is adapted to receive data representative of updated control law variables and attitude commands. The flight computer is operable to transmit the updated control law variables and, in response to the attitude commands, to supply exhaust nozzle position commands. The controller is configured to implement a control law, and is adapted to receive the updated control law variables and the exhaust nozzle position commands. The controller is to modify the implemented control law to include the updated control law variables and, in response to the nozzle position commands, to supply one or more nozzle actuator control signals. The actuator is coupled to the engine exhaust nozzle, and is adapted to receive the nozzle actuator control signals. The actuator is configured, in response to the nozzle actuator control signals, to move the exhaust nozzle to the commanded position.

In yet still another exemplary embodiment, a method of operating a thrust vector actuation system includes determining whether to operate the thrust vector actuation system in at least one of a control mode and a monitor mode. If it is determined that the system should operate in the monitor mode, at least writable access is provided to one or more parameters of a control algorithm, whereby any of the one or more parameters may be updated. The control algorithm is updated to include at least the parameters that were updated.

Other independent features and advantages of the preferred thrust vector actuation control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of engine, or in a particular type of vehicle. Thus, although the present embodiment is, for convenience of explanation, depicted and described as being implemented in a multi-stage rocket, it will be appreciated that it can be implemented in various other types of vehicles, and in various other systems and environments.

Figure 1:
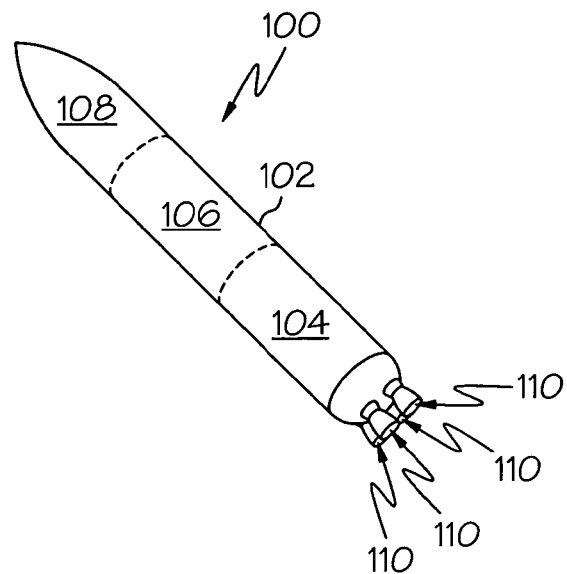
FIG. 1 is a simplified side elevation view of a rocket that may include the thrust vector actuation system of the present invention.

Turning now to the description, and with reference first to FIG. 1, a simplified elevation side view of an exemplary multi-stage rocket 100 is shown. The rocket 100 includes a main body 102 that is divided into multiple stages. In the depicted embodiment, the main body is divided into three stages, a first stage 104, a second stage 106, and a third stage 108. It will be appreciated, however, that the rocket 100 could be implemented with more or less than this number of stages. As is generally known, the first stage 104 is used during take-off of the rocket. After a predetermined amount of time, and/or one or more predetermined events, the first stage 104 separates from the main body 102, and the second stage 106 is used to fly the rocket 100. Thereafter, and once again after a predetermined amount of time, and/or one or more predetermined events, the second stage 106 separates from the main body 102, and the third stage 108 is then used to fly the rocket 100.

Each stage 104–108 includes one or more non-illustrated engines, which may be any one of numerous types of engines, but are preferably solid rocket propellant engines. No matter the particular type of engine that is used, the engine exhausts through a plurality of exhaust nozzles 110, which are preferably spaced equidistantly about a rear wall of each stage 104–108. It will be appreciated that, for clarity, only the exhaust nozzles associated with the first stage 104 are illustrated. It will additionally be appreciated that, although four exhaust nozzles 110 are shown, more or less than four exhaust nozzles 110 could be used in any, or all, of the stages 104–108.

Figure 2:
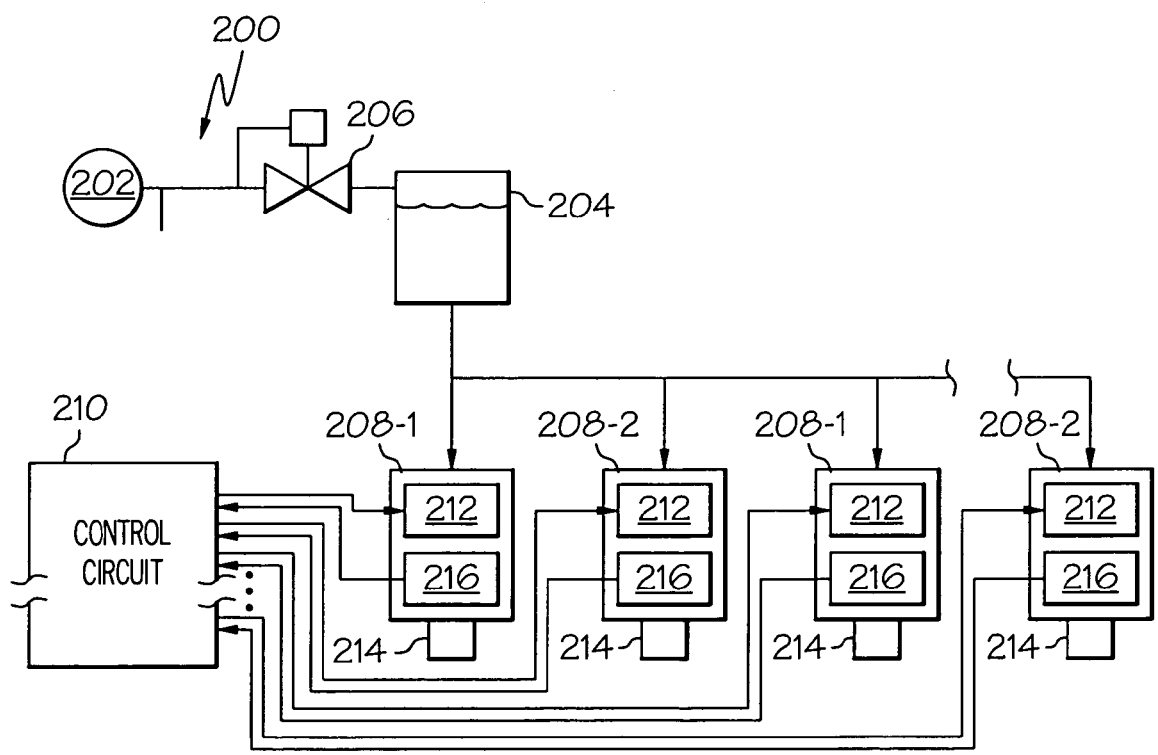
FIG. 2 is a simplified schematic representation of a thrust vector actuation system according to an embodiment of the present invention.

The nozzles 110 in each stage 104–108 are each movably mounted within its respective stage 104–108, and are moved to a desired position by one or more actuators (not shown in FIG. 1). In the depicted embodiment, the nozzles 110 are each configured to move with at least two degrees of freedom, to thereby provide pitch and yaw attitude control to the rocket 100. Thus, as will be described more fully below, each nozzle 110 includes a pitch actuator and a yaw actuator. It will be appreciated, however, that the nozzles 110 could be configured to move with only a single degree of freedom, or with more than two degrees of freedom. Thus, the rocket 100 may also include more or less than two actuators per nozzle 110. The actuators associated with each nozzle 110 may be any one of numerous types of actuators. However, in the depicted embodiment, the actuators are each electrohydraulic servo actuators, and are controlled using a blowdown hydraulic actuator control system. A simplified schematic representation of an exemplary embodiment of a thrust vector actuation control system 200 implemented using a blowdown hydraulic system is shown in FIG. 2, and will now be briefly described.

The actuation control system 200 includes a pressure vessel 202, a hydraulic fluid tank 204, a pressure regulator 206, a plurality of nozzle actuators 208, and a thrust vector actuation control circuit 210. The pressure vessel 202 is pressurized with a gas to a predetermined pressure. Preferably, an inert gas such as, for example, helium is used to pressurize the pressure vessel 202. The pressurized gas in the pressure vessel 202 is then supplied, via the pressure regulator 206, to the hydraulic fluid tank 204.

The hydraulic fluid tank 204 contains a predetermined amount of hydraulic fluid, which is pressurized by the gas in the pressure vessel 202. The amount of hydraulic fluid contained in the hydraulic fluid tank 204 is sufficient to operate the nozzle actuators 208 in each stage 104–108 throughout the flight of the rocket 100. The hydraulic fluid tank contained within the hydraulic fluid tank 204 may be any one of numerous types of relatively incompressible fluids such as, for example, hydraulic oil.

The pressurized hydraulic fluid is delivered to each of the nozzle actuators 208. As was previously noted, each nozzle 110 preferably includes at least a pitch actuator 208-1 and a yaw actuator 208-2. The nozzle actuators 208, as was also previously noted, are each electrohydraulic servo actuators. Thus, each actuator 208-1, 208-2 includes one or more electrically-operated servovalves 212 and an actuator ram 214. Beyond this, the construction of the nozzle actuators 208 that are used in the depicted embodiment are generally well known and will therefore not be further described in any detail. The servovalves 212 are each coupled to receive actuator control signals from the thrust vector actuation control circuit 210 and, in response to these signals, appropriately ports hydraulic fluid pressure to the actuator ram 214, which in turn moves its associated exhaust nozzle 110 to the appropriate position.

The nozzle actuators 208 each include a position sensor 216. The position sensors 216 supply signals to the thrust vector actuation control circuit 210 that are representative of nozzle actuator position, and thus actual vehicle attitude (e.g., actual vehicle pitch and vehicle yaw). Because the nozzle actuators 208 are coupled to the nozzles 110, the position signals are also representative of nozzle position. The position sensors 216 may be any one of numerous types of position sensors including, but not limited to, RVDTs (rotary variable differential transformers), potentiometers, Hall effect sensors, or eddy current sensors. In the depicted embodiment, however, the positions sensors 216 are each LVDT (linear variable differential transformer) type of sensors. It will be appreciated that the use of the position sensors 216 is merely exemplary of a particular preferred embodiment, and that other control schemes, other than a position control loop, could be used.

Figure 3:
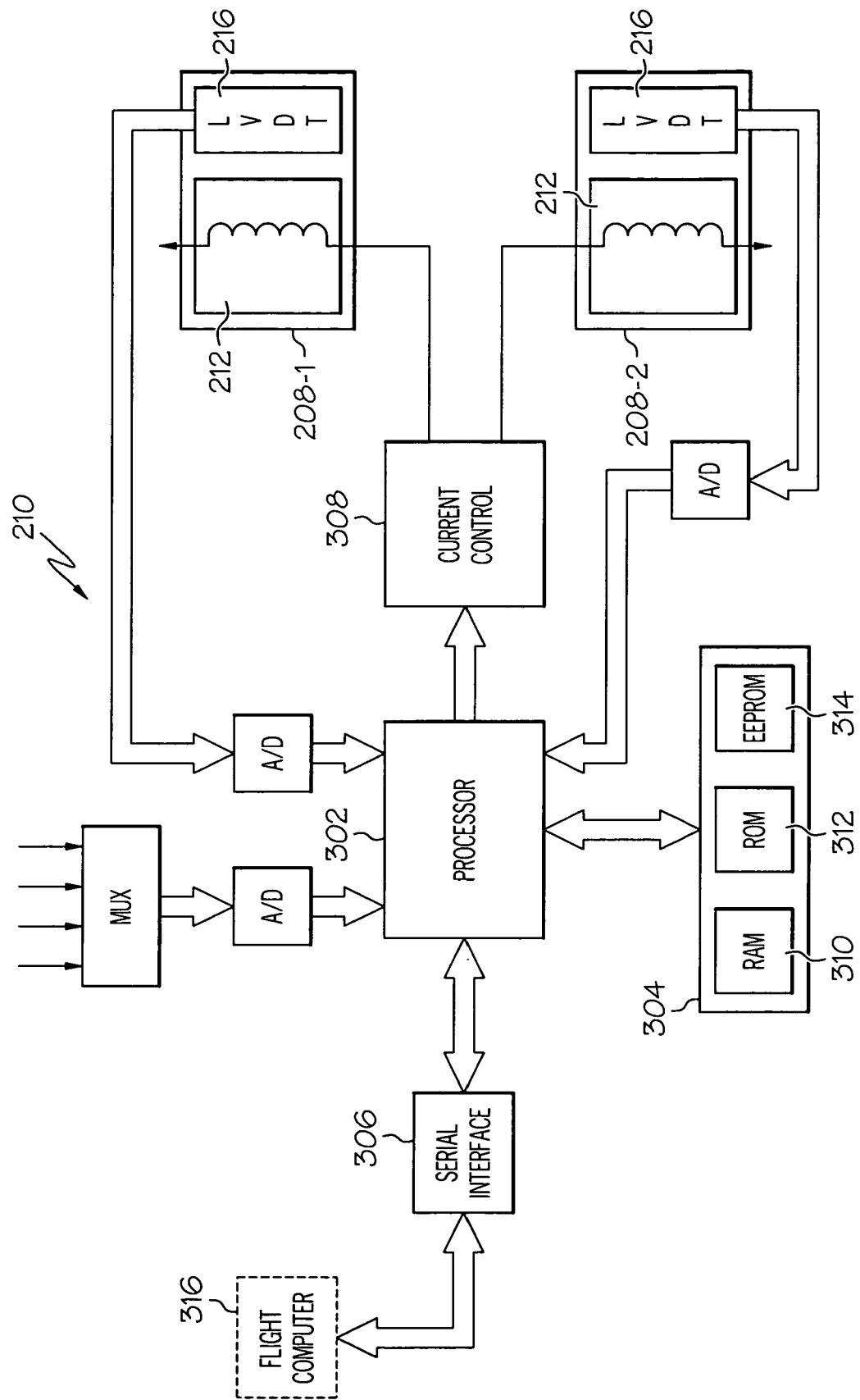
FIG. 3 is a functional block diagram of an exemplary embodiment of the thrust vector actuation system control circuit that may be used in the rocket and system of FIGS. 1 and 2, respectively.

Turning to FIG. 3, the thrust vector actuator control circuit 210 will now be described. As was just noted above, the thrust vector actuator control circuit 210 supplies the actuator control signals to the nozzle actuator servovalves 212 and, in the depicted embodiment, includes a processor 302, memory 304, a serial interface 306, and a current control circuit 308. The processor 302 may be any one of numerous known general purpose processors or an application specific processor that operates in response to program instructions. Such program instructions may be stored in the memory 304, which may include random access memory (RAM) 310, read-only-memory (ROM) 312, and electronically-erasable-programmable-read-only-memory (EEPROM) 314. For example, the operating system software may be stored in the ROM 312, whereas various operating mode software routines and various operational parameters, such as gains and compensation parameters, may be stored in the RAM 310 and EEPROM 314, respectively. It will be appreciated that this is merely exemplary of one scheme for storing operating software, software routines, and operational parameters, and that various other storage schemes may be implemented. It will also be appreciated that the processor 302 may be implemented using various other circuits, not just a programmable processor. For example, digital logic circuits and analog signal processing circuits could also be used.

The processor 302 receives various data from an on-board flight computer 316 (shown in phantom in FIG. 3), and also transmits data to the flight computer 316, via the serial interface 306. It will be appreciated that communication between the flight computer 316 and the serial interface 306 could be wireless or via a hardwired connection. The serial interface 306 may be any one of numerous known serial interface circuits including, for example, RS-232, RS-422, and RS-485 serial interface circuits. In the depicted embodiment, an RS-422 serial interface circuit is used. Among the data that the processor 302 receives from the flight computer 316, via the serial interface 306, are rocket attitude commands such as, for example, pitch and yaw commands. The processor 302 additionally receives signals representative of actual vehicle pitch and yaw positions from each of the actuator position sensors 216. The processor 302, implementing a control algorithm, compares the pitch and yaw commands with the actual vehicle pitch and yaw, and supplies position error signals to the current control circuit 308. It is noted that the control algorithm includes various gains and compensation parameters. Thus, in the depicted embodiment, the position error signals supplied by the processor 302 are digital words representing filtered and compensated position error signals.

The current control circuit 308 receives the position error signals from the processor 302 and, in response, supplies actuator control signals to the pitch 208-1 and yaw 208-2 actuators. More particularly, in the depicted embodiment, the current control circuit 308 converts the digital position error signals received from the processor 302 into analog current commands. The current control circuit 308 compares the analog current commands with actual actuator currents flowing through coils in each of the servovalves 212, and supplies a current error signal. The current error signal is used to pulse width modulate the actuator control signals supplied to the pitch 208-1 and yaw 208-2 actuators. It will be appreciated that the current control circuit 308 may implemented in any one of numerous circuit configurations, and its functions may be implemented in hardware, software, firmware, or a combination thereof. For example, the current control circuit 308 may be implemented as an individual ASIC (application specific integrated circuit), as part of the processor 302, or from discrete components.

As FIG. 3 additionally shows, and as was previously alluded to, the processor 302 also receives signals representative of various system parameters. Some non-limiting examples of the parametric signals supplied to the processor include, pressure and temperature of the pressure vessel 202, pressure and fluid level in the hydraulic fluid tank 204, control pressure supplied to each actuator 208, and position signals from each position sensor 216. It will be appreciated that these signals may be analog or digital, and may be supplied to the processor individually or, preferably, via a multiplexer circuit 318. If the signals are analog, one or more analog-to-digital (A/D) circuits may be provided.

No matter the particular number or type of system parameters are monitored and supplied to the processor 302, the processor 302 appropriately processes the signals and transmits appropriately formatted data representative of each parameter to the flight computer 316. Thus, the flight computer 316 can determine system status in real-time and, if necessary, can supply commands to the system to take appropriate corrective action. The flight computer 316 can also (or instead) transmit the system status data to a remote station, which can also (or instead) determine system status in real-time and, if necessary, can supply commands to the system to take appropriate corrective action.

In addition to receiving vehicle attitude commands from the flight computer 316, the processor 302 also monitors each communication received from the flight computer 316 to determine whether it should switch from a control mode to a monitor mode. For example, if a particular bit pattern is set in a communication from the flight computer 316, the processor 302 may switch to the monitor mode. In the monitor mode, various parameters in the control algorithm can be modified and/or updated. For example, one or more system gains and/or compensation parameters may be updated. Thus, if the control algorithm is not properly controlling vehicle attitude or, if for some reason, the system is, or is becoming, unstable, updated parameters can be supplied to the thrust vector actuation control circuit 210. The updated parameters are stored in the EEPROM 314 and, upon exiting the monitor mode, the processor 302 then uses the updated parameters as part of the normal control algorithm.

Figure 4:
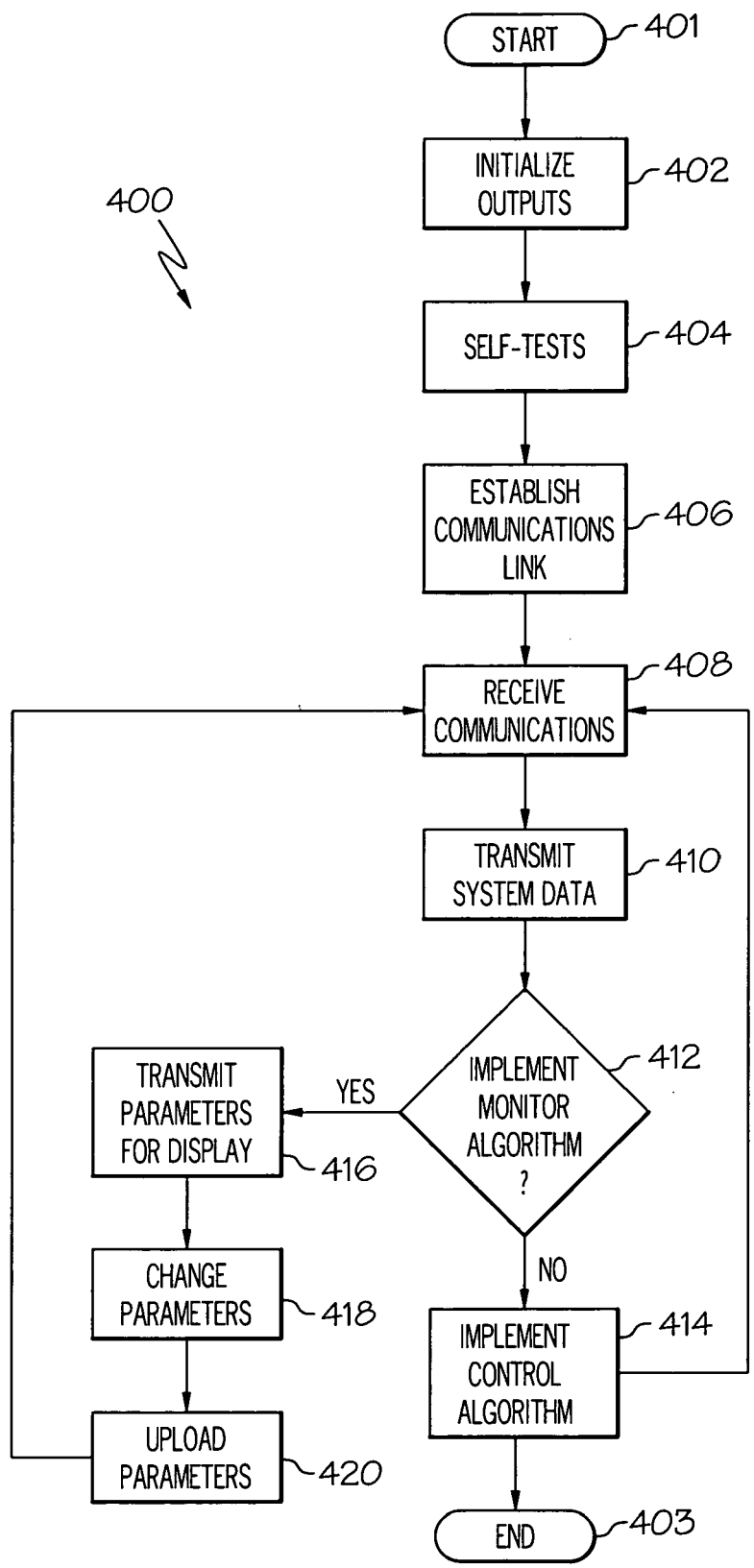
FIG. 4 is a flowchart depicting an exemplary methodology that may be implemented by the exemplary control circuit of FIG. 3.

The thrust vector actuator control circuit 210, as was noted above, preferably implements software control logic in either a control mode, in which a control algorithm is implemented, or a monitor mode, in which an update algorithm is implemented that allows various parameters of the control algorithm to be updated. An exemplary embodiment of at least a portion of this software control logic will be now described in more detail. In doing so, reference should be made to FIG. 4, which depicts an exemplary embodiment of the control logic in flowchart form. It should be appreciated that the parenthetical references in the following discussion correspond to the flowchart blocks shown in FIG. 4.

The control logic 400 begins upon system initialization or start-up, at which point the outputs of the control circuit 210 are initialized (402). The control circuit 210 then runs a battery of self-tests (404) to, among other things, ensure the circuit 210 and one or more of the associated communications paths are functioning properly. Thereafter, the communications link is established between the control circuit 210 and the flight computer 316 (406).

Once the communications link is established with the flight computer 316, the control circuit 210 begins receiving communications from the flight computer 316 (408), and transmitting system data to the flight computer (410). As was noted above, each time a communication is received from the flight computer 316, the control circuit 210 determines whether it should implement the monitor algorithm or the control algorithm (412). If the control circuit 210 determines that the control algorithm should be implemented, the control circuit 210 supplies appropriate command signals to the actuators 208, if necessary, based on the vehicle attitude commands transmitted from the flight computer 316 (414).

Conversely, if the control circuit 210 determines that the monitor algorithm should be implemented, then the control circuit 210 transmits the updatable system parameters to the flight computer 316, which then transmits these parameters to a remote station for display (416). Although the parameters can be displayed in any one of numerous formats, each is preferably displayed with its present value and its address in memory. Using a user interface, such as a keyboard, a user may then selectively change one or more of the displayed parameters (418) by, for example, typing in the updated value and its associated memory address (320). Once the user has updated all of the parameters he/she wishes to update (418), the flight computer 316 once again establishes communication with the control circuit 210 and uploads the updated parameters into memory (420). The control logic 400, or at least a portion thereof, then repeats.

For convenience, a single actuation control system 200, and a single thrust vector actuation control circuit 210 were described above. However, it is noted that the vehicle may include more than one actuation control system and thus more than one thrust vector actuation control circuit 210. For example, above-described rocket 100 includes three stages 104–108. Thus, each stage 104–108 preferably includes an actuation control system 200. In such an instance, it will be appreciated that the thrust vector actuation control circuit 210 in each stage may communication with one another.

The thrust vector actuation control system and method disclosed herein allows for self-testing of the entire actuation system and/or its individual system components. The system also provides real-time, continuous monitoring of actuation system status, and allows system gain and compensation parameters to be changed during vehicle operation remote from its launch site. The control circuit used in the system is implemented in a manner that provides increased reliability, reduced weight, and reduced cost, relative to present control circuits.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A thrust vector actuation control system for controlling one or more engine exhaust nozzles, comprising:
    a controller configured to implement a control law and adapted to receive (i) data representative of actuation control system status, (ii) one or more nozzle position commands from a flight computer, and (iii) data representative of updated control law variables, and configured (i) to transmit at least some of the actuation system status data to the flight computer, (ii) in response to the one or more nozzle position commands, to supply one or more nozzle actuator control signals, and (iii) upon receipt of updated control law variables, to modify the implemented control law to include the updated control law variables; and
    one or more actuators adapted to receive the nozzle actuator control signals and configured, in response thereto, to move one or more engine exhaust nozzles to the commanded position.

2. The system of claim 1, further comprising:
    one or more memory circuits in operable communication with the controller and configured to store the control law variables.

3. The system of claim 1, further comprising:
    one or more position sensors adapted to supply position signals representative of rocket nozzle position.

4. The system of claim 3, wherein the controller is:
    coupled to receive the position signals from the one or more position sensors; and
    configured to supply the nozzle actuator control signals based at least in part on the position signals.

5. The system of claim 1, further comprising:
    one or more pressure sensors adapted to supply pressure data representative of various system pressures;
    one or more temperature sensors adapted to supply temperature data representative of various system temperatures; and
    one or more fluid level sensors adapted to supply fluid level data representative of various system fluid levels,
    wherein at least a portion of the data representative of actuation control system status includes the pressure data, the temperature data, and fluid level data.

6. The system of claim 1, wherein the nozzle actuator control signals supplied by the controller are digital signals, and wherein the system further comprises:
    a digital-to-analog (D/A) conversion circuit coupled to receive the digital nozzle actuator control signals and operable, in response thereto, to supply analog nozzle actuator control signals to the one or more actuators.

7. The system of claim 6, wherein the analog actuator control signals supplied by the D/A conversion circuit are analog current signals.

8. The system of claim 7, wherein the D/A conversion circuit is:
    adapted to receive actual actuator current signals representative of current flow magnitude through the one or more actuators; and
    configured to supply the analog current signals based at least in part on the actual current signals.

9. The system of claim 1, further comprising:
    one or more additional controllers,
    wherein each controller is in operable communication with one another.

10. The system of claim 7, wherein the D/A conversion circuit is:
    adapted to receive actual actuator current signals representative of current flow magnitude through the one or more actuators; and
    configured to supply the analog current signals based at least in part on the actual current signals.

11. A thrust vector actuation control system for controlling one or more engine exhaust nozzles, comprising:
- a controller configured to implement a control law, the controller adapted to receive (i) data representative of updated control law variables and (ii) one or more nozzle position commands from a flight computer, and further configured (i) to modify the implemented control law to include the updated control law variables and (ii) in response to the nozzle position command, to supply one or more nozzle actuator control signals; and
- one or more actuators adapted to receive the nozzle actuator control signals and configured, in response thereto, to move one or more engine exhaust nozzles to the commanded position.

12. The system of claim 11, further comprising:
- one or more memory circuits in operable communication with the controller and configured to store the control law variables.

13. The system of claim 11, further comprising:
- one or more position sensors adapted to supply position signals representative of rocket nozzle position.

14. The system of claim 13, wherein the controller is:
- coupled to receive the position signals from the one or more position sensors; and
- configured to supply the nozzle actuator control signals based at least in part on the position signals.

15. The system of claim 11, wherein:
- the controller is further adapted to receive data representative of actuation control system status and configured, in response thereto, to transmit at least a portion of the actuation system status data to the flight computer.

16. The system of claim 15, further comprising:
- one or more pressure sensors adapted to supply pressure data representative of various system pressures;
- one or more temperature sensors adapted to supply temperature data representative of various system temperatures; and
- one or more fluid level sensors adapted to supply fluid level data representative of various system fluid levels,
- wherein at least a portion of the data representative of actuation control system status includes the pressure data, the temperature data, and fluid level data.

17. The system of claim 11, wherein the nozzle actuator control signals supplied by the controller are digital signals, and wherein the system further comprises:
- a digital-to-analog (D/A) conversion circuit coupled to receive the digital nozzle actuator control signals and operable, in response thereto, to supply analog nozzle actuator control signals to the one or more actuators.

18. The system of claim 17, wherein the analog actuator control signals supplied by the D/A conversion circuit are analog current signals.

19. The system of claim 11, further comprising:
- one or more additional controllers,
wherein each controller is in operable communication with one another.

20. A propulsion vehicle, comprising:
- an engine;
- a movable exhaust nozzle in fluid communication with the engine to receive exhaust therefrom;
- a flight computer adapted to receive (i) data representative of updated control law variables and (ii) vehicle attitude commands, the flight computer operable to (i) transmit the updated control law variables and (ii) in response to the vehicle attitude commands, to supply exhaust nozzle position commands;
- a controller configured to implement a control law, the controller adapted to receive (i) the updated control law variables and (ii) the exhaust nozzle position commands and operable (i) to modify the implemented control law to include the updated control law variables and (ii) in response to the nozzle position command, to supply one or more nozzle actuator control signals; and
- an actuator coupled to the engine exhaust nozzle, the actuator adapted to receive the nozzle actuator control signals and configured, in response thereto, to move the exhaust nozzle to the commanded position, to thereby move the vehicle to the commanded vehicle attitude.

21. The propulsion vehicle of claim 20, wherein:
- the propulsion vehicle comprises a plurality of stages, each stage including the engine, the moveable exhaust nozzle, the controller, and the actuator; and
- the controller in each stage is in operable communication with the controller in each of the other stages.

22. A method of operating a thrust vector actuation system, comprising the steps of:
- determining whether to operate the thrust vector actuation system in at least one of a control mode and a monitor mode;
- providing at least writable access to one or more parameters of a control algorithm if it is determined that the system should operate in the monitor mode, whereby any of the one or more parameters may be updated; and
- updating the control algorithm to include at least the parameters that were updated.

* * * * *